(12) United States Patent
Kauffmann et al.

(10) Patent No.: US 10,733,464 B2
(45) Date of Patent: Aug. 4, 2020

(54) METHOD, SYSTEM AND DEVICE OF OBTAINING 3D-INFORMATION OF OBJECTS

(71) Applicant: MOTHERSON INNOVATIONS COMPANY LIMITED, London (GB)

(72) Inventors: Maximilian Kauffmann, Stuttgart (DE); Kai Uwe Hagenburg, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/381,732

(22) Filed: Apr. 11, 2019

(65) Prior Publication Data
US 2019/0318178 A1    Oct. 17, 2019

(30) Foreign Application Priority Data

Apr. 12, 2018 (DE) .................. 10 2018 108 751

(51) Int. Cl.
 *G06K 9/00* (2006.01)
 *B60R 1/00* (2006.01)
 *G06T 5/00* (2006.01)

(52) U.S. Cl.
 CPC ............ *G06K 9/00812* (2013.01); *B60R 1/00* (2013.01); *G06K 9/00671* (2013.01); *G06T 5/006* (2013.01); *B60R 2300/105* (2013.01); *B60R 2300/607* (2013.01)

(58) Field of Classification Search
 CPC ............ G06K 9/00812; G06K 9/00671; G06T 5/006; G06T 17/00; G06T 3/0068; G06T 3/005; G06T 2207/30252; G06T 7/55; G06T 5/50; B60R 1/00; B60R 2300/105; B60R 2300/607; B60R 2300/307; B60R 2300/303
 USPC ........................................................ 348/148
 See application file for complete search history.

(56) References Cited

U.S. PATENT DOCUMENTS

| | | | |
|---|---|---|---|
| 8,106,755 B1* | 1/2012 | Knox ........................ | B60R 1/00 340/439 |
| 2006/0192660 A1 | 8/2006 | Watanabe et al. | |
| 2009/0175492 A1* | 7/2009 | Chen .................. | G06K 9/00791 382/100 |
| 2010/0259372 A1 | 10/2010 | Hideshiro et al. | |
| 2016/0180590 A1* | 6/2016 | Kamhi ............... | G06K 9/00671 345/633 |

(Continued)

FOREIGN PATENT DOCUMENTS

| | | |
|---|---|---|
| DE | 102011077143 A1 | 12/2012 |
| DE | 102014107156 A1 | 11/2014 |

(Continued)

OTHER PUBLICATIONS

British Office Action dated Oct. 9, 2019 of application No. GB 1904934.5.

(Continued)

*Primary Examiner* — Tung T Vo
(74) *Attorney, Agent, or Firm* — Jones Day

(57) ABSTRACT

A method for obtaining 3D information of objects shown in at least two images obtained by at least two on-vehicle sensors, a device for carrying out the respective steps of the method, a system including such a device, and a vehicle including such a device or such a system are described.

11 Claims, 4 Drawing Sheets

(56) References Cited

U.S. PATENT DOCUMENTS

2016/0360104 A1* 12/2016 Zhang .................. H04N 13/239
2016/0368417 A1* 12/2016 Bassi ........................ B60R 1/00

FOREIGN PATENT DOCUMENTS

| DE | 102014012250 A1 | 3/2015 |
| DE | 102013018543 A1 | 5/2015 |
| DE | 102015223176 A1 | 5/2017 |
| EP | 1830321 A2 | 9/2007 |
| EP | 2985734 A1 | 7/2019 |
| WO | WO 2018/133996 A1 | 7/2018 |

OTHER PUBLICATIONS

German Office Action dated Mar. 12, 2019 of German application DE 10 2018 108 751.9.

* cited by examiner

METHOD, SYSTEM AND DEVICE OF OBTAINING 3D-INFORMATION OF OBJECTS

CROSS-REFERENCE TO RELATED APPLICATIONS

This application claims the benefit of foreign priority to German Patent Application No. DE 10 2018 108 751.9, filed Apr. 12, 2018, which is hereby incorporated by reference in its entirety for all purposes.

BACKGROUND

1. Field of the Invention

The present disclosure relates to a method for obtaining 3D information of objects at least partly shown in at least two images obtained by at least two on-vehicle sensors, a device for carrying out the respective steps of the method, a system including such a device, and a vehicle including such a device or such a system.

2. Description of Related Art

In the state of the art displays of advanced driver assistance systems (ADAS) provided in vehicles, especially motor vehicles, show image presentation in a two-dimensional way. As a consequence, the driver of the vehicle is not able to judge from a still frame the distances and depths of objects present in the image presentation in a correct and precise manner.

Hence, despite assistant systems are available on board of the vehicle, the driver has still to pay high attention to the display for the purpose of interpreting and understanding the image presentation with respect to the individual objects shown thereon. For example during parking the driver has carefully analyze the image presentation to avoid hitting objects present in the scene. Said attention additionally required goes along with higher inattention of the driver towards other events. This in turn leads to an increased risk of accidents.

Therefore, the invention aims at providing information concerning the vehicle's environment in a more comfortable, reliable and safe manner.

SUMMARY

In one aspect, a method for obtaining 3D information of objects at least partly shown in at least two images obtained by at least two on-vehicle sensors, includes the steps of: Receiving at least one first image obtained by a first sensor device; Receiving at least one second image obtained by a second sensor device; Generating a shared 3D space by combining information from at least the first image and the second image; Identifying at least one object in the shared 3D space, whereby the object is shown at least partly in the first and at least partly in second image; Determining at least one 3D information of the object; and Performing, based on the determined 3D information, at least one action.

The method may further include the steps of: (i) receiving at least one third image, preferably a plurality of third images, obtained by at least one third sensor device, preferably by a plurality of third sensor devices; (ii) applying distortion correction, especially lens distortion correction, at least partially on the first image, especially based on at least one predefined parameter, particularly a lens parameter, of the first sensor device; (iii) applying distortion correction, especially lens distortion correction, at least partially on the second image, especially based on at least one predefined parameter, particularly a lens parameter, of the second sensor device; (iv) applying distortion correction, especially lens distortion correction, at least partially on the third image, especially based on at least one predefined parameter, particularly a lens parameter, of the third sensor device; and/or (v) receiving at least partly one surround view image, generating at least partly at least one surround view image by a surround view image processor, generating at least partly at least one surround view image for at least one driver assistance system and/or displaying at least partly at least one surround view image by at least one driver assistance system, wherein especially the surround view image is based at least partially on at least the first image, the second image and/or the third image.

Generating the shared 3D space may further include the step of: performing 3D data mapping, especially at least partly of the first, second and/or third image, and/or determining at least a part of shared field of views of the respective images.

Generating the shared 3D space may further include the step of: matching objects, at least the object, at least partly shown in the first image, in the second image and/or the third image, particularly by means of (a) image feature registration, especially having large disparities, (b) tracking over time, (c) determined structures of motion of objects and/or (d) at least one random sample consensus (RANSAC)-based method.

The shared 3D space may at least partly be, include and/or represent a model of at least one part of the vehicle's environment, particularly at least one part of the surrounding area of the vehicle.

The 3D information may be determined at least partly based on the shared 3D space. The 3D information may include at least partly at least one depth information and/or distance. The distance may be a distance of the object measured with respect to at least one reference point, particularly at least one reference point at least partly located on or at the vehicle. The surround view image may include at least partly at least one first image part, wherein the first image part is at least partly obtained by at least the step including: clipping the first image at least partly along at least one first border, at least one second image part, wherein the second image part is at least partly obtained by at least the step including: clipping the second image at least partly along at least one second border, and/or at least one third image part, wherein the third image part is at least partly obtained by at least the step including: clipping the third image along at least one third border.

Performing the action may include the steps of: (i) determining if the object is located at least partially inside at least one blind spot area of the surround view image, wherein especially the object is located inside the blind spot area if the object is outside and/or partially outside of the first image part and/or outside and/or partially outside of the second image part; and preferably in reaction to the determination that the object is located at least partially inside the blind spot area, especially further including the step of: adjusting at least one part of the first border and/or the second border in order to include the object at least partly in the first image part and/or in the second image part; (ii) triggering a signaling device, for informing the driver of the vehicle about the object, if the 3D information of the object exceeds and/or falls below a first threshold; (iii) enhancing at least one of the following application with the 3D information of the object: surround view application, parking application, especially with distances between 1.5 meters and 2 meters, far view application, especially with more than 20 meters; (iv) rearranging at least a part of the surround view image, especially by means of changing, particularly increasing and/or decreasing, the zoom level of the surround view image, highlighting the object at least partly on the surround view image and/or isolating the object at least partly on the surround view image, dependent on the 3D information of the object, especially if the 3D information of the object exceeds and/or falls below a second threshold; and/or (v) forwarding the 3D information of the object at least partly to at least one advanced driver assistance system.

In another aspect, a device for obtaining 3D information of objects shown in at least two images obtained by at least two on-vehicle sensors, includes at least one processor adapted to carry out the steps of the method.

In another aspect, a system for obtaining 3D information of objects shown in at least two images obtained by at least two on-vehicle sensors, includes at least one first sensor device; at least one second sensor device; and at least one device.

The system may further include at least one third sensor device, preferably a plurality of third sensor devices; the system may further include at least one driver assistance system and/or at least one signaling device; at least one bird view system processor and/or at least one surround view image processor; and/or the system may further include at least one device adapted to execute at least one of the following application: surround view application, parking application, especially with distances between 1.5 meters and 2 meters, far view application, especially with more than 20 meters.

The first sensor device may be adapted to obtain at least partly at least a first image; the first sensor device may at least partly include and/or represent at least one first camera, at least one first camera monitor system (cms) camera, at least one first mirror replacement camera, at least one first back-up camera, at least one first camera of the vehicle's advanced driver assistant system, at least one first bird view image processor providing at least one bird view image, at least one first surround view image processor providing at least one surround view image, at least one first radar device, at least one first lidar device and/or at least one first ultrasonic device.

The first sensor device may include at least partly at least one fisheye lens and/or is attached or attachable to the vehicle at a first position; the second sensor device may be adapted to obtain at least partly at least a second image.

The second sensor device may at least partly include and/or respresent at least one second camera, at least one second camera monitor system (cms) camera, at least one second mirror replacement camera, at least one second back-up camera, at least one second camera of the vehicle's advanced driver assistant system, at least one second bird view image processor providing at least one bird view image, at least one second surround view image processor providing at least one surround view image, at least one second radar device, at least one second lidar device and/or at least one second ultrasonic device.

The third sensor device may at least partly include at least one fisheye lens and/or is attached or attachable to the vehicle at a third position.

The third sensor device may be adapted to obtain at least partly at least a third image; (viii) the third sensor device may at least partly include and/or represent at least one third camera, at least one third content management system (cms) camera, at least one third mirror replacement camera, at least one third back-up camera, at least one third camera of the vehicle's advanced driver assistant system, at least one third bird view image processor providing at least one bird view image, at least one third surround view image processor providing at least one surround view image, at least one third radar device, at least one third lidar device and/or at least one third ultrasonic device.

The second sensor device may include at least partly at least one fisheye lens and/or is attached or attachable to the vehicle at a second position.

The first sensor device and the second sensor device may have essentially the same global field of view, the first sensor device and the third sensor device have essentially the same global field of view, the second sensor device and the third sensor device may have essentially the same global field of view, the first image obtained by the first sensor device has a large area of intersection with the second image obtained by the second sensor device, the first image obtained by the first sensor device has a large area of intersection with the third image obtained by the third sensor device and/or the second image obtained by the second sensor device has a large area of intersection with the third image obtained by the third sensor device.

In another aspect, a vehicle, especially a motor vehicle, includes at least partly a device and/or a system.

The first sensor device may be at least partly attached to the vehicle at a first position, the second sensor device may be at least partly attached to the vehicle at a second position and/or the third sensor device may be at least partly attached to the vehicle at a third position.

It has, thus, been advantageously found that a first and a second image obtained by a first and second sensor device, especially by a first and a second camera, can be advantageously used for the purpose of determining of at least one 3D information of at least one object shown on both images if the image information of both images is combined into a shared 3D space.

Here, the term "shared 3D space" can be used to refer to a 3D model of at least a part of the vehicle's environment, whereby the model is generated based on at least the first and second images.

Advantageously, data mapping can be used for combining the information into the shared 3D space.

Here, the term "data mapping" can be used to refer to every kind of mapping one pixel of a first image to another pixel of a second image, hence, allowing to obtain 3D information with respect to at least a part of an object which is part of the images including the respective pixels.

It has been found that by means of the shared 3D space objects at least partly shown on both images can be identified and in addition related 3D information of the respective objects can be determined in a very comfortable, stable and efficient way.

Based on the 3D information at least one action can be performed which improves the experience for the driver and also improves safety.

In an example, it is beneficial that two images are sufficient in order to implement the present invention. Although it is also possible to use even more than two images, i.e. at least one third image, preferably a plurality of third images, obtained by at least one, preferably obtained by a plurality of third sensor devices. By utilizing more than two images for the purpose of generating the shared 3D space an even higher accuracy of the data model and information derived therefrom can be achieved as it is already possible when two images form the basis. The plurality of images might be generated such that each of the first, second and/or third sensor device provides single pictures each and/or might be a plurality of images that is acquired each by the first, second and/or third sensor device, especially as successive images.

In examples, every kind of image source can be used as the first and second sensor device. It is, thus, possible to rely on sensor devices already existing on the vehicle, such as camera monitor system (cms) cameras, mirror replacement cameras, back-up cameras or cameras of a vehicle's advanced driver assistant system. It is furthermore possible to rely on images utilized elsewhere such as a bird view image or a surround view image, hence, using respective bird view image processors or surround view image processors providing respective images as an appropriate sensor device in the sense of the present invention. This makes additional devices unnecessary and also reduces computational power since images can be re-used which are available anyway.

Especially it has been found that image distortions, particularly due fisheye lenses of cameras utilized for obtaining first, second and/or third images, can be corrected by means of appropriate algorithms known in the art. It is, thus, all the more possible to rely on any camera already provided at the vehicle for the purposes of the present invention.

For generating the shared 3D space, matching of objects shown in both, the first and the second image (or in even more images if more than two images are received), can be carried out. This especially allows to make sure that one and the same object also appears in the shared 3D space as a single object only.

Based on the shared 3D space it is advantageously possible to detect objects and/or determine 3D information of respective objects, especially on basis of the information associated with the respective voxel (3D-pixel) of the shared 3D space. Particularly the 3D information includes a depth information. This may be a relative or an absolute value. The 3D information may in addition or alternatively also include a distance value. This value may be stated with reference to a certain reference point. For example the reference point can be chosen with respect to a certain position on or at the vehicle.

Also advantageous, having generated the shared 3D space it is also possible to use the 3D information for determining if a certain object is located at least partially inside at least one blind spot area of a surround view image. The surround view image can then be adapted in case there is an object present in the blind spot area. This ensures that every object which might pose a risk to the vehicle, the driver, the object itself or any combination thereof, is reliable at least partly shown on the surround view image. Preferably, the same images used for generating the surround view image can also be used for creating the shared 3D space, so that resources are saved.

Thus, a multi-sensor based system that can generate 3D information from particularly any camera positioning on the car and with any lens type is proposed. If 3D information is available, this information could be used to inform the driver, e.g. about object distances (e.g. wall during parking, height of bridges, and the like). Such a system and such 3D information might in addition or alternatively substitute information of other sensors and the other sensors as well.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1A:
FIGS. 1a and 1b show an example of first and second images representing a first scene.
Figure 1B:

FIGS. 1a and 1b show, respectively, a first image and a second image representing a first scene. The two images of the first scene are taken on a parking lot. The first image shown in FIG. 1a is obtained by a first sensor device which includes a first camera attached to a vehicle at a first position. The first position is on top of the vehicle. The second image shown in FIG. 1b is obtained by a second sensor device which includes a second camera attached to the vehicle at a second position. The second position is on the, with respect to a main driving direction, left side of the vehicle, i.e. the driver side in a right hand traffic vehicle.

The first sensor device and the second sensor device have essentially the same global field of view, hence, the first image obtained by the first sensor device has a large area of intersection with the second image obtained by the second sensor device.

Figure 2A:
FIGS. 2a and 2b show an example of first and second images representing a second scene.
Figure 2B:

FIGS. 2a and 2b show, respectively, a first image and a second image includes a second scene. The two images of the second scene are taken on a parking lot. The first image shown in FIG. 2a is obtained by a first sensor device which represents a first mirror-replacement camera attached to a vehicle at a first position. The first position is on the, with respect to a main driving direction, right side of the vehicle, particularly a mirror-replacement position, i.e. on the passenger side of a car for right-hand traffic. The second image shown in FIG. 2b is obtained by a second sensor device which includes a second camera attached to the vehicle at a second position. The second position is on the right side, i.e. passenger side, of the vehicle. The second sensor device includes a fisheye lens. Particularly, the second sensor device here is a second camera of the vehicle's advanced driver assistant system, e.g., a part of a bird view system.

Obviously, for the second scene at least the second image obtained by the second sensor device has a large area of intersection with the first image obtained by the first sensor device.

Figure 3A:
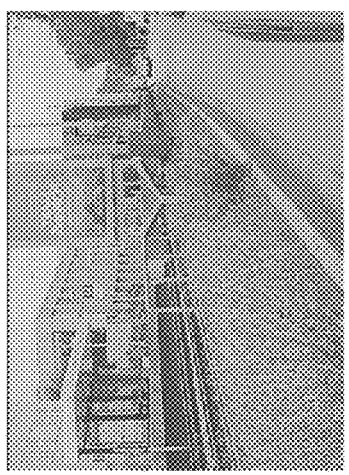
FIGS. 3a, 3b, 3c show an example of first, second and third images representing a third scene.
Figure 3B:
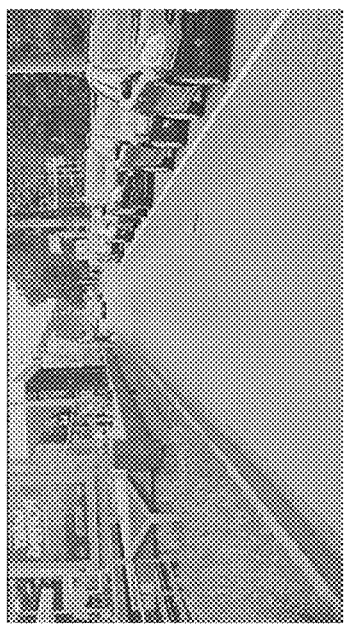
Figure 3C:
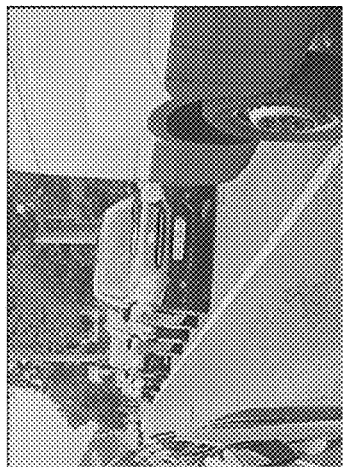

FIGS. 3a, 3b and 3c show, respectively, a first image, a second image and—in contrast to the previous scenes—also a third image representing a third scene. The three images of the third scene are taken on a road in the city. The first image shown in FIG. 3a is obtained by a first sensor device which represents a first mirror-replacement camera attached to a vehicle at a first position. The first position is on the passenger side of the vehicle, particularly a first mirror-replacement position. The second image shown in FIG. 2b is obtained by a second sensor device which represents a second camera, especially a back-up camera, attached to the vehicle at a second position. The second position is on top of the vehicle. The third image shown in FIG. 3c is obtained by a third sensor device which represents a second mirror-replacement camera attached to a vehicle at a third position. The third position is on the left side of the vehicle, particularly a second mirror-replacement position.

The first sensor device and the second sensor device have essentially the same global field of view, hence, the first image obtained by the first sensor device has a large area of intersection with the second image obtained by the second sensor device. In an analogous manner, the second sensor device and the third sensor device have essentially the same global field of view, hence, the second image obtained by the second sensor device has a large area of intersection with the third image obtained by the third sensor device.

Figure 4:
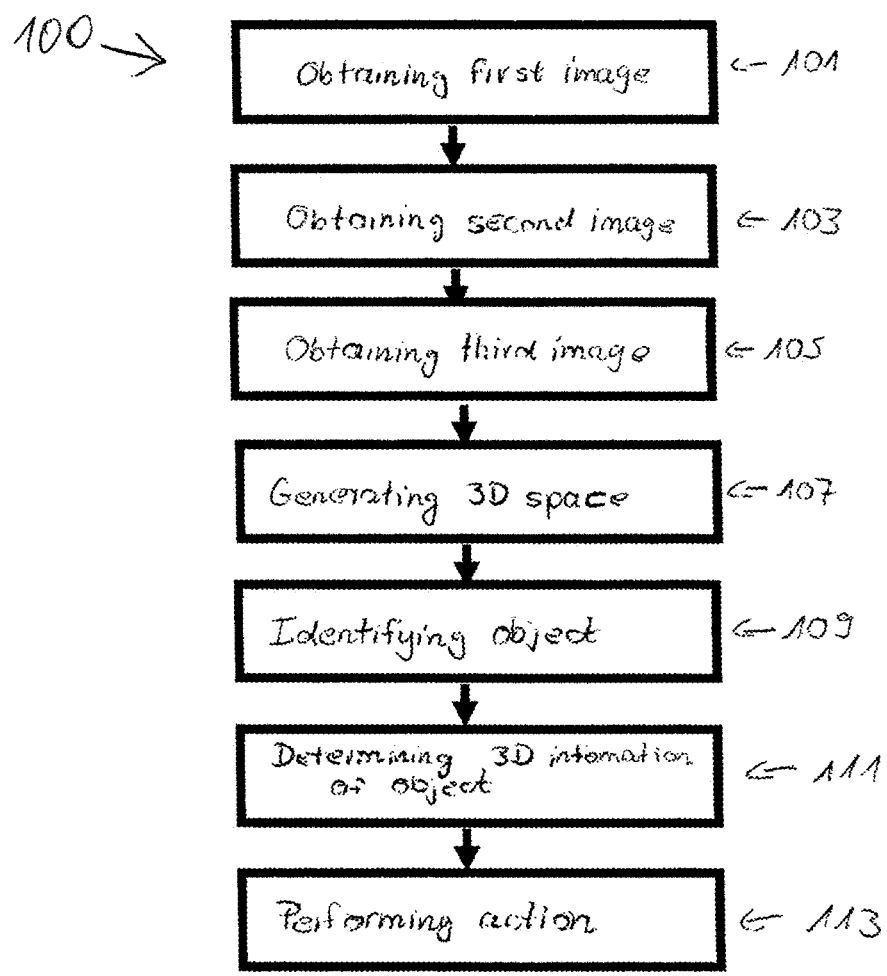
FIG. 4 shows a functional diagram of an example method for obtaining 3D information of objects shown in at least two images.

FIG. 4 shows a functional diagram of a method 100 for obtaining 3D information of objects shown in at least two images obtained by the three on-vehicle sensors as described above with respect to scene three according to an embodiment of the first aspect of the invention.

In steps 101, 103 and 105 of the method 100, respectively, the first, the second and the third image obtained by, respectively, the first, the second and the third sensor device is received. In a step 107 a shared 3D space is generated by combining information from at least the first image, the second image and the third image. I.e., information from different views is combined into the shared 3D space.

For generating the shared 3D space shared field of views of the first, second and third images are determined. I.e. the overlapping areas of the first and second, first and third and second and third images are determined for appropriate combining the respective images in the shared 3D space. Generating the shared 3D space further includes matching objects commonly shown at least partly in at least two images of the first image, the second image and/or the third image. Preferably, matching is carried out by means of image feature registration, particularly having large disparities, tracking over time, determined structures of motion of objects and/or at least one random sample consensus (RANSAC)-based method.

No distortion correction is applied to the images since no fisheye lenses are used for the sensor devices. Preferably, the sensor devices, especially the cameras, utilized for the method, device and/or system are already calibrated, especially internally and/or externally.

In a step 109 of the method 100 at least one object in the shared 3D space is identified, whereby the object is shown in the first, second and/or third image.

Figure 5A:
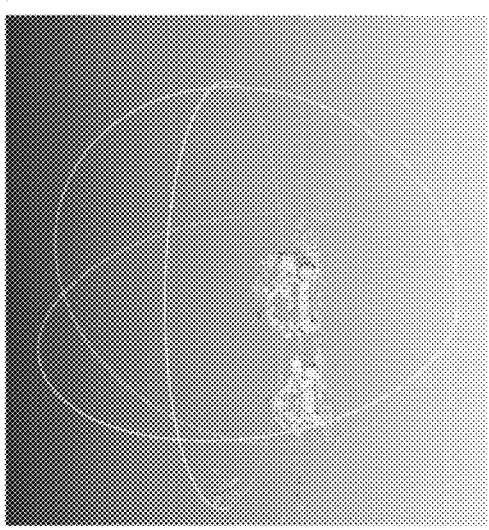
FIGS. 5a, 5b, 5c show an example of a shared 3D space from a first, second and third viewing angle.
Figure 5B:
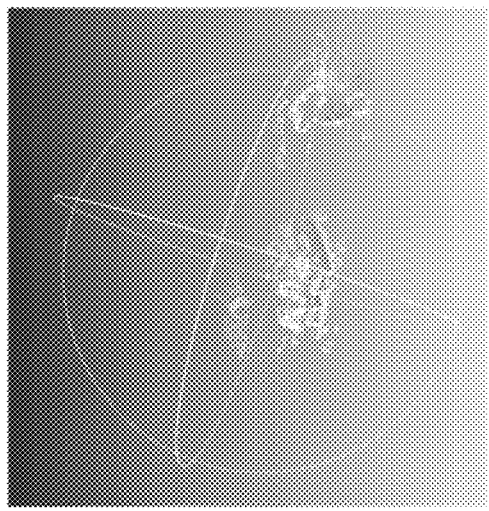
Figure 5C:
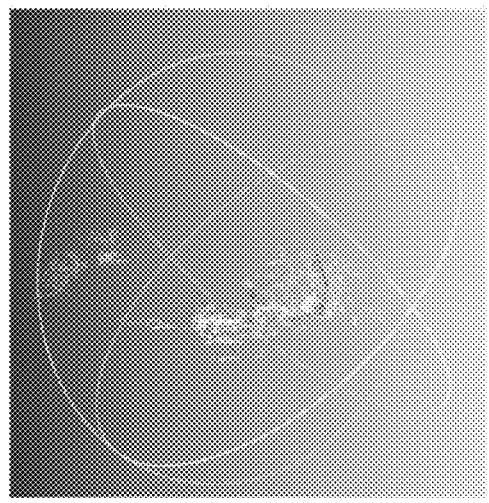

Here, the shared 3D space represents a model of at least one part of the vehicle's environment. FIGS. 5a-5c show the shared 3D space with two objects identified (namely two cars that are parked at the right hand side of the vehicle) from, respectively, a first, a second and a third viewing angle.

In a step 111 of the method 100 at least one 3D information of at least one of the objects is determined. Particularly a distance of the object with respect to a reference point located on the vehicle is determined. In a step 113 of the method 100 based on the 3D information, at least one action is performed.

The action performed includes enhancing at least one of the following application with the 3D information of the object: Surround view application, parking application, especially with distances between 1.5 meters and 2 meters, far view application, especially with more than 20 meters.

Figure 6:
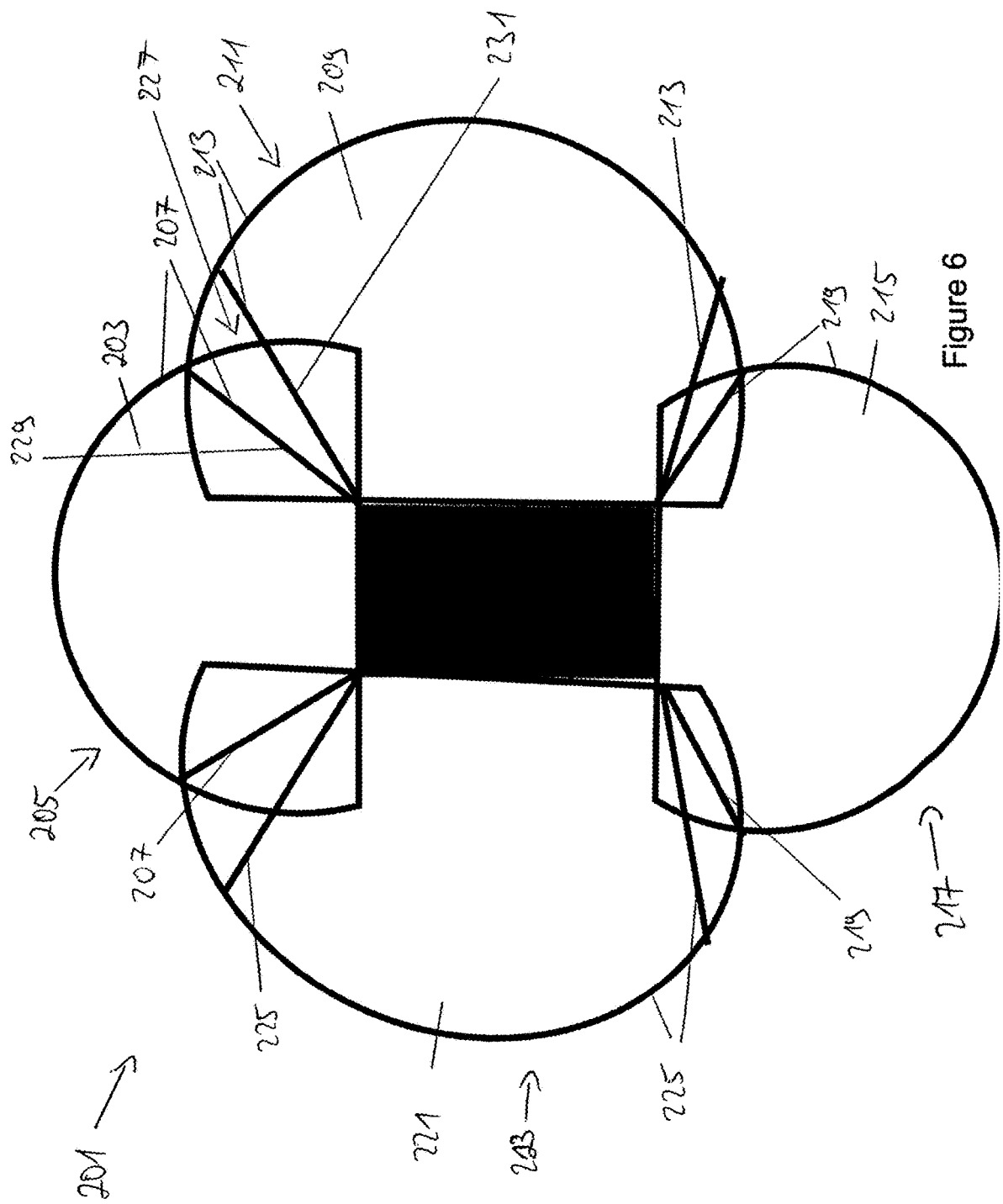
FIG. 6 shows a schematic representation of an example of a surround view image.

Another method (for which no functional diagram is shown) similar to method 100 as described with respect to FIG. 4 includes a further step of generating at least one surround view image by a surround view image processor. FIG. 6 shows a schematic representation of the respective surround view image 201. The surround view image 201 includes at least one first image part 203, wherein the first image part is obtained by clipping a first image 205 along at least one first border 207, one second image part 209, wherein the second image part 209 is obtained by clipping a second image 211 along at least one second border 213, one first third image part 215, wherein the first third image part 215 is obtained by clipping a first third image 217 along at least one first third border 219, and one second third image part 221, wherein the second third image part 221 is obtained by clipping a second third image 223 along at least one second third border 225.

Here, the action performed includes the further step of: Determining if the object is located at least partially inside at least one blind spot area 227 of the surround view image 201. The object is located inside the blind spot area 227 if the object is outside or partially outside of the first image part 203 and/or outside or partially outside of the second image part 209.

If it is determined that the object is located at least partially inside the blind spot area 227, the method include the further step of: Adjusting at least one part 229 of the first border 207 and/or at least one part 231 of the second border 213 in order to include the object in the first image part 203 and/or in the second image part 209.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

100 Method
101-113 Step
201 Surround view image
203 Image Part
205 Image
207 Border
209 Image Part
211 Image
213 Border
215 Image Part
217 Image
219 Border
221 Image Part 223 Image
225 Border
227 Blind spot area
229 Part of Border
231 Part of Border

What is claimed is:

1. A method for obtaining 3D information of objects at least partly shown in at least two images obtained by at least two on-vehicle, sensor devices, comprising:
receiving at least one first image obtained by a first sensor device;
receiving at least one second image obtained by a second sensor device;
generating a shared 3D space by combining information from at least the first image and the second image;
identifying at least one object in the shared 3D space, whereby the object is shown at least partly in the first and at least partly in the second image;
determining at least one 3D information of the object; and
performing, based on the determined 3D information, at least one action;
wherein performing the action comprises determining if the object is located at least partially inside at least one blind spot area of the surround view image, wherein the object is located inside the blind spot area if the object is outside or partially outside of the first image part or outside or partially outside of the second image part, and in response to determining that the object is located at least partially inside the blind spot area, adjusting at least one part of the first border or the second border in order to include the object at least partly in the first image part or in the second image part;
triggering a signaling device, for informing the driver of the vehicle about the object, if the 3D information of the object exceeds or falls below a first threshold;
enhancing at least one of the following application with the 3D information of the object: surround view application, parking application, especially with distances between 1.5 meters and 2 meters, far view application, especially with more than 20 meters;
rearranging at least a part of the surround view image, especially by means of changing, particularly increasing or decreasing, the zoom level of the surround view image, highlighting the object at least partly on the surround view image or isolating the object at least partly on the surround view image, dependent on the 3D information of the object, especially if the 3D information of the object exceeds or falls below a second threshold; and
forwarding the 3D information of the object at least partly to at least one advanced driver assistance system.

2. The method of claim 1, further comprising at least one of:
receiving at least one third image or a plurality of third images obtained by at least one third sensor device or a plurality of third sensor devices;
applying distortion correction or lens distortion correction, at least partially on the first image, based on at least one predefined parameter including a lens parameter of the first sensor device;
applying distortion correction or lens distortion correction, at least partially on the second image, based on at least one predefined parameter including a lens parameter of the second sensor device;
applying distortion correction or lens distortion correction, at least partially on the third image, based on at least one predefined parameter including a lens parameter of the third sensor device; and
receiving at least partly one surround view image, generating at least partly at least one surround view image by a surround view image processor, generating at least partly at least one surround view image for at least one driver assistance system, or displaying at least partly at least one surround view image by at least one driver assistance system, wherein the surround view image is based at least partially on at least one or more of the first image, the second image and the third image.

3. The method of claim 1, wherein at least one of
generating the shared 3D space further comprises performing 3D data mapping, at least partly of the first, second and/or third image, and/or determining at least a part of shared field of views of the respective images;
generating the shared 3D space further comprises matching objects, at least the object, at least partly shown in the first image, in the second image and/or the third image, using (a) image feature registration having large disparities, (b) tracking over time, (c) determined structures of motion of objects and/or (d) at least one random sample consensus (RANSAC)-based method;
the shared 3D space at least partly is, comprises and/or represents a model of at least one part of the vehicle's environment, particularly at least one part of the surrounding area of the vehicle;
the 3D information is determined at least partly based on the shared 3D space;
the 3D information comprises at least partly at least one depth information and/or distance;
the distance is a distance of the object measured with respect to at least one reference point, particularly at least one reference point at least partly located on or at the vehicle; and
the surround view image comprises at least partly at least one first image part, wherein the first image part is at least partly obtained by clipping the first image at least partly along at least one first border, at least one second image part, wherein the second image part is at least partly obtained by clipping the second image at least partly along at least one second border, and/or at least one third image part, wherein the third image part is at least partly obtained by clipping the third image along at least one third border.

4. A device for obtaining 3D information of objects shown in at least two images obtained by at least two on-vehicle sensors, comprising at least one processor configured to carry out the steps of the method of claim 1.

5. A system for obtaining 3D information of objects shown in at least two images obtained by at least two on-vehicle sensors, comprising:
at least one first sensor device;
at least one second sensor device; and
at least one device according to claim 4.

6. The system of claim 5, further comprising at least one of:
at least one third sensor device or a plurality of third sensor devices;
at least one driver assistance system and/or at least one signaling device;
at least one bird view system processor and/or at least one surround view image processor; and
at least one device adapted to execute at least one of the following application: surround view application, parking application with distances between 1.5 meters and 2 meters, far view application with more than 20 meters.

7. The system of claim 5, wherein the first sensor device is adapted to obtain at least partly at least a first image;

the first sensor device at least partly comprises and/or represents at least one first camera, at least one first camera monitor system (cms) camera, at least one first mirror replacement camera, at least one first back-up camera, at least one first camera of the vehicle's advanced driver assistant system, at least one first bird view image processor providing at least one bird view image, at least one first surround view image processor providing at least one surround view image, at least one first radar device, at least one first lidar device and/or at least one first ultrasonic device;

the first sensor device comprises at least partly at least one fisheye lens and/or is attached or attachable to the vehicle at a first position;

the second sensor device is adapted to obtain at least partly at least a second image;

the second sensor device at least partly comprises and/or represents at least one second camera, at least one second camera monitor system (cms) camera, at least one second mirror replacement camera, at least one second back-up camera, at least one second camera of the vehicle's advanced driver assistant system, at least one second bird view image processor providing at least one bird view image, at least one second surround view image processor providing at least one surround view image, at least one second radar device, at least one second lidar device and/or at least one second ultrasonic device;

the third sensor device at least partly comprises at least one fisheye lens and/or is attached or attachable to the vehicle at a third position;

the third sensor device is adapted to obtain at least partly at least a third image;

the third sensor device at least partly comprises and/or represents at least one third camera, at least one third camera monitor system (cms) camera, at least one third mirror replacement camera, at least one third back-up camera, at least one third camera of the vehicle's advanced driver assistant system, at least one third bird view image processor providing at least one bird view image, at least one third surround view image processor providing at least one surround view image, at least one third radar device, at least one third lidar device and/or at least one third ultrasonic device;

the second sensor device comprises at least partly at least one fisheye lens and/or is attached or attachable to the vehicle at a second position; and the first sensor device and the second sensor device have essentially the same global field of view, the first sensor device and the third sensor device have essentially the same global field of view, the second sensor device and the third sensor device have essentially the same global field of view, the first image obtained by the first sensor device has a large area of intersection with the second image obtained by the second sensor device, the first image obtained by the first sensor device has a large area of intersection with the third image obtained by the third sensor device and/or the second image obtained by the second sensor device has a large area of intersection with the third image obtained by the third sensor device.

8. A motor vehicle, comprising a device according to claim 4.

9. The motor vehicle of claim 8, wherein the first sensor device is at least partly attached to the vehicle at a first position, the second sensor device is at least partly attached to the vehicle at a second position and/or the third sensor device is at least partly attached to the vehicle at a third position.

10. A motor vehicle, comprising a system according to claim 5.

11. The motor vehicle of claim 10, wherein the first sensor device is at least partly attached to the vehicle at a first position, the second sensor device is at least partly attached to the vehicle at a second position and/or the third sensor device is at least partly attached to the vehicle at a third position.

* * * * *